United States Patent [19]
Zervas et al.

[11] Patent Number: 5,375,010
[45] Date of Patent: Dec. 20, 1994

[54] OPTICAL AMPLIFIER

[75] Inventors: Michael N. Zervas, Southampton; Richard I. Laming; David N. Payne, both of Southampton, all of Great Britain

[73] Assignee: University of Southampton, Hampshire, England

[21] Appl. No.: 12,043

[22] Filed: Feb. 1, 1993

[30] Foreign Application Priority Data

Feb. 20, 1992 [GB] United Kingdom ............... 9203590

[51] Int. Cl.$^5$ .......................... G02B 6/00; H01S 3/06; H01S 3/094
[52] U.S. Cl. ....................................... 359/341; 372/6; 372/703
[58] Field of Search ............... 359/341, 337; 372/6, 372/703

[56] References Cited

U.S. PATENT DOCUMENTS 5,295,217 3/1994 Marcerou et al. ................ 385/122

Primary Examiner—Nelson Moskowitz
Attorney, Agent, or Firm—Brooks Haidt Haffner & Delahunty

[57] ABSTRACT

An optical amplifier comprises first (22) and second (24) lengths of erbium-doped fibre connected in series via an isolator 20 which reduces the transmission of backward-travelling ASE from the second length to the first length when pump power in inputted in to the first length.

7 Claims, 7 Drawing Sheets

TOTAL INSERTION LOSS (dB) = Splice Loss (dB) + Isolator Loss (dB) +
        Splice Loss (dB) + WDM Loss (dB) + Splice Loss(dB)

TOTAL INSERTION LOSS (dB) = Splice Loss (dB) + WDM Loss(dB) +
        Splice Loss (dB)

OPTICAL AMPLIFIER

This invention relates to optical amplifiers, and more particularly, but not exclusively, to Erbium-doped Fibre Amplifiers (EDFAs).

EFDAs are proving to be components of tremendous importance in a number of optoelectronic applications. This is due to their compatibility with the fibre network, low insertion loss, polarisation insensitivity, high gain levels and near quantum-limited performance. In the field of optical communications, EDFAs are expected to be extensively used both as pre- and line-amplifiers guaranteeing multichannel amplification with insignificant cross-talk, multigigabit rates accompanied by low bit-error rates.

As shown in FIG. 1 of the accompanying drawings, a known basic configuration of an EDFA, pumped in the forward direction, consists of a length 10 of active, erbium-doped fibre (EDF) spliced onto the output arm 3 of a wavelength-division-multiplexing (WDM) fibre coupler 12. The input arms 1 and 2 of this coupler are used for launching the signal and pump from power sources 14 and 16, respectively, into the active-fibre 10. In a well designed system, the maximum gain efficiency should be achieved, i.e. the maximum attainable gain for the lowest pump power. In this case, the pump source can be operated at a low current and its lifetime substantially extended. However, in the basic configuration of FIG. 1, the optimum gain efficiency is always accompanied by a compromise in noise figure to a value well above the quantum limit. This is due to the fact that in an amplifier exhibiting large gain (and associated amplified spontaneous emission (ASE)), the backwards-travelling ASE is comparable to the pump power at the input of the EDF and readily saturates the gain, thus reducing the population inversion and increasing the noise figure. In this regime, increasing the pump power always improves the population inversion and decreases the noise figure but at the expense of gain efficiency and pump diode reliability.

An object of the present invention is to reduce the above-mentioned problem caused by backward-travelling ASE.

The invention broadly provides an optical amplifier comprising first and second lengths of active fibre connected in series via means for reducing the transmission of backward-travelling ASE from the second length to the first length when pump signal power is inputted in to said first length for transmission through said first and second lengths.

The invention includes an optical amplifier comprising first and second lengths of active fibre connected in series via means for reducing the transmission of backward-travelling ASE from the second length to the first length, when pump power is inputted in to said first length for transmission through said first and second lengths, and bypass means for bypassing said backward-travelling ASE transmission reducing means at the pump wavelength. In this case the first and second lengths may be respective lengths of erbium-doped fibre and said backward-travelling ASE transmission reducing means may comprise an optical isolator adapted to transmit wavelengths of about 1550 nm from the first length to the second length and reduce the transmission of wavelengths of about 1550 nm from the second length to the first length.

The invention also includes an optical amplifier comprising first and second lengths of active fibre connected in series via means for reducing the transmission of backward-travelling ASE from the second length to the first length, when pump power is inputted in to said first length for transmission through said first and second lengths, said backward-travelling ASE transmission reducing means allowing transmission therethrough from the first length to the transmission reducing means at the pump wavelength. In this case the backward-travelling ASE transmission reducing means may comprise an optical isolator adapted to transmit wavelengths of about 980 nm and about 1550 nm from the first length to the second length and to reduce transmission of wavelengths of about 1550 nm from the second length to the first length.

The invention also includes an optical amplifier comprising first and second lengths of an erbium-doped fibre connected in series via means for reducing the transmission of backward-travelling ASE from the second length to the first length when pump power is inputted in to the said first length for transmission through said first and second lengths, wherein the first length has a length which is 0.3±0.15% of the total length of the first and second lengths of said erbium-doped fibre. In this case the optical amplifier may also have the features defined above.

It is to be understood that whilst the invention has been defined above with reference to two lengths of fibre connected in series via a backward-travelling ASE transmission reducing means, an optical amplifier in accordance with the invention may comprise at least three of said lengths of fibre connected in series with a respective said backward-travelling ASE transmission reducing means between each adjacent upstream and downstream length of fibre.

In order that the invention may be well understood, two embodiments thereof, which are given by way of example only, and a known optical amplifier, will now be described with reference to the accompanying drawings, in which:

FIG. 1 schematically shows a known EDFA to which reference has already been made;

FIGS. 2(a) and 2(b) schematically show two embodiments of the invention wherein an EDFA incorporates an isolator;

FIGS. 3(a) and 3(b) show signal, pump, forward and backward ASE power distribution along the length of active fibre in an EDFA in accordance with FIG. 1 and FIGS. 2(a) and 2(b) respectively;

Figure 1:
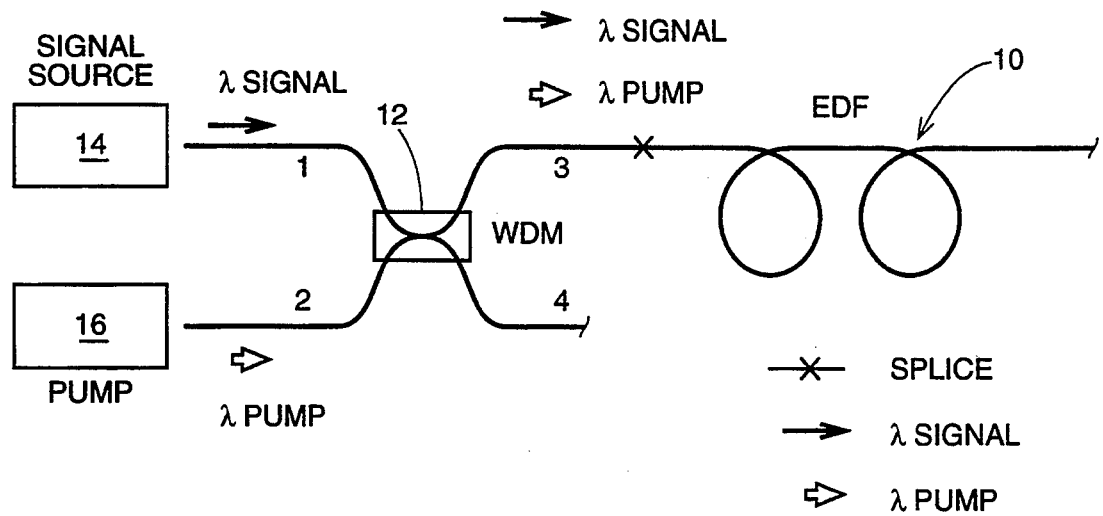
Figure 10A:
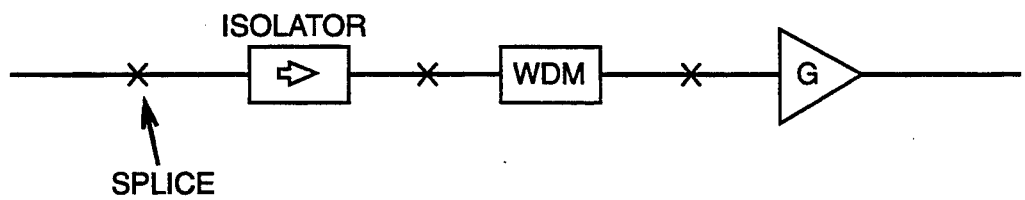
Figure 10B:
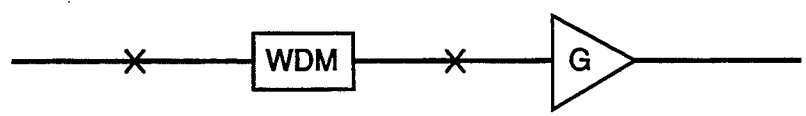

FIGS. 10(a) and 10(b) respectively show the various contributions to the total insertion loss of an EDFA in accordance with FIG. 1 and an EDFA incorporating an isolator.

Figure 2A:
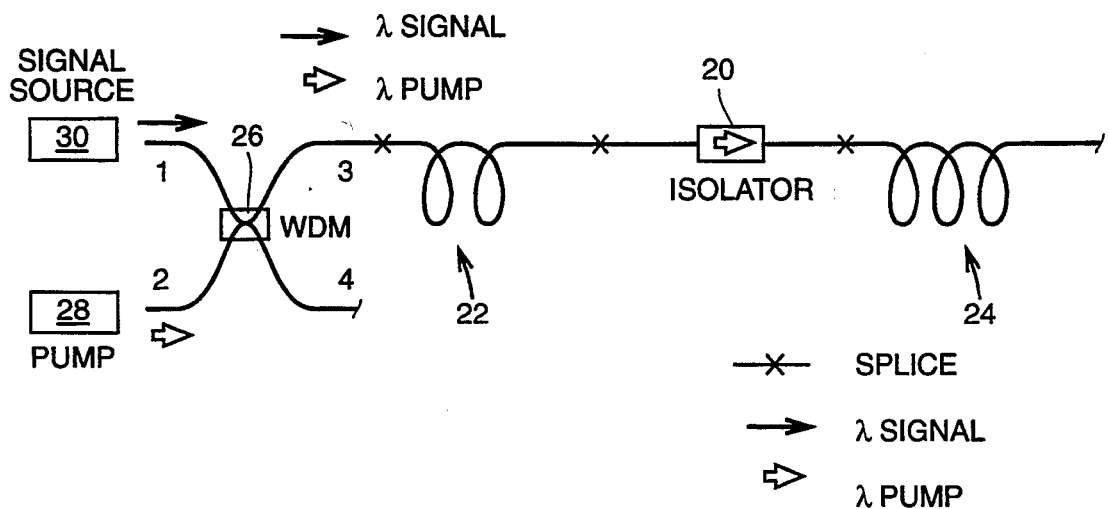

The amplifier configuration shown in FIG. 2(a) comprises a commercially-available fibre isolator 20 incorporated into the erbium-doped segment of an EDFA. The active length of the amplifier thus comprises two lengths 22, 24 of an erbium-doped fibre (EDF) connected in series with the isolator 20 spliced in between. A wavelength-division-multiplexing (WDM) coupler 26 is used to launch both the pump, which is at a wavelength of about 980 nm, and signal, which is at a wavelength of about 1550 nm, into the first, or upstream length 22, whereupon they are transmitted via the isolator to the second or downstream length 24. The amplifier is pumped in the forward direction, i.e. the pump and signal from the respective sources 28, 30 co-propagate. The isolator 20 is designed to transmit the signal, forward ASE and pump wavelengths with low loss (typical values: pump loss<1.0 dB, signal loss<3.0 dB). The required isolation at the signal wavelength is greater than 25 dB, although no isolation is required at the pump wavelength. Thus the isolator 20 forms a means for reducing the backward-travelling ASE from the second length of EDF to the first length of EDF when pump power is inputted in to the first length for transmission through the first and second lengths.

Figure 2B:
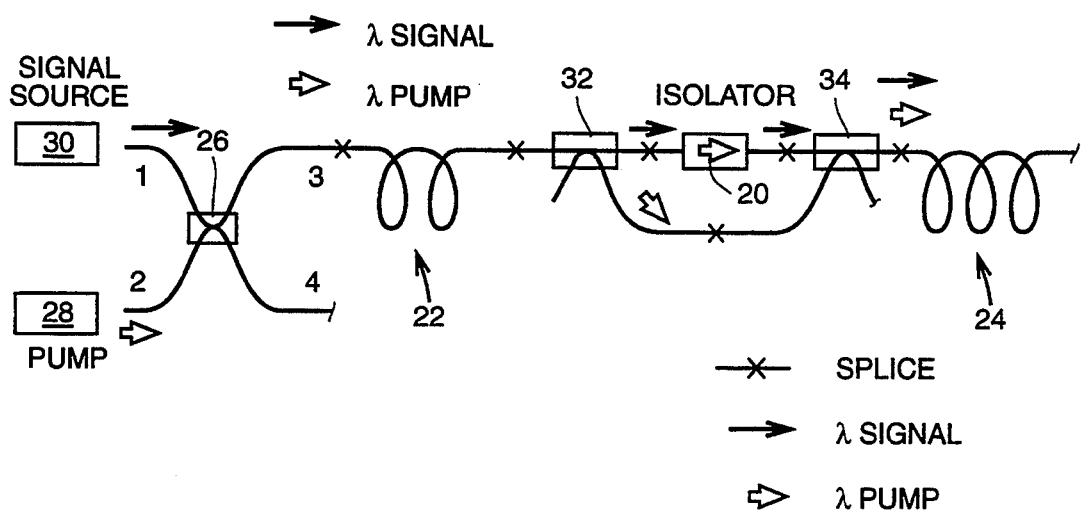

In FIG. 2(b), in which parts similar to parts shown in FIG. 2(a) are given like reference numerals, there is shown an alternative embodiment in which the pump power bypasses the isolator 20 in order to eliminate the effect of its loss. Two low-loss WDM fibre couplers 32, 34 respectively (typical loss<0.1 dB) are utilised to extract the residual pump power upstream of the isolator 20 and re-launch it into the length 24 of erbium-doped fibre downstream of the isolator.

It will be understood that in the FIG. 2(a) arrangement the isolator 20 is adapted to transmit wavelengths at at least about 980 nm and 1550 nm from the first length 22 of EDF to the second length 24 thereof and to reduce transmission of wavelengths of about 1550 nm from the second length 24 to the first length 22, whereas in the arrangement in FIG. 2(b) where by-pass means comprising the WDM fibre couplers 32, 34 are provided for by-passing the isolator 20 at the pump wavelength (about 980 nm) the isolator need only be adapted to transmit wavelengths at about 1550 nm from the first length to the second length whilst reducing the transmission of wavelengths of about 1550 nm from the second length to the first length.

Figure 3A:
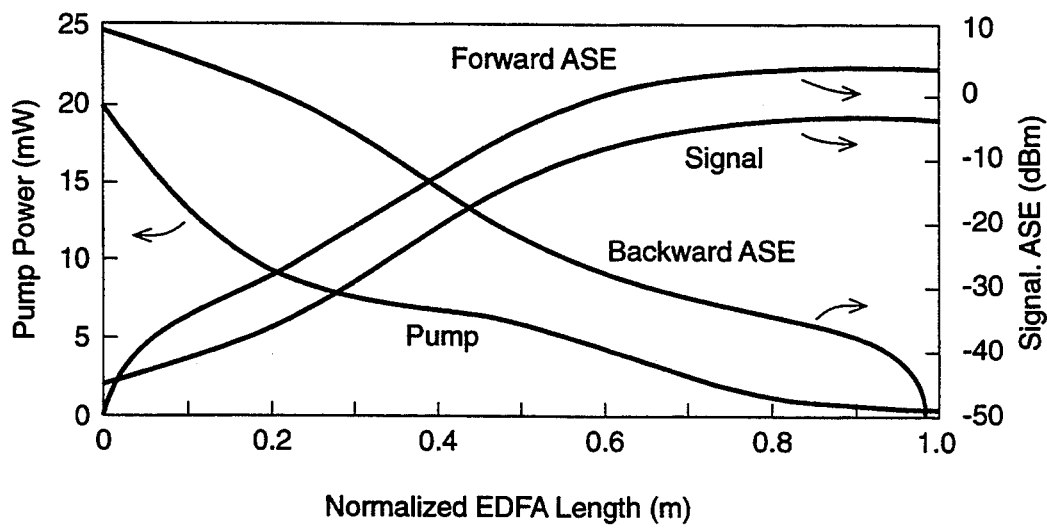
Figure 3B:
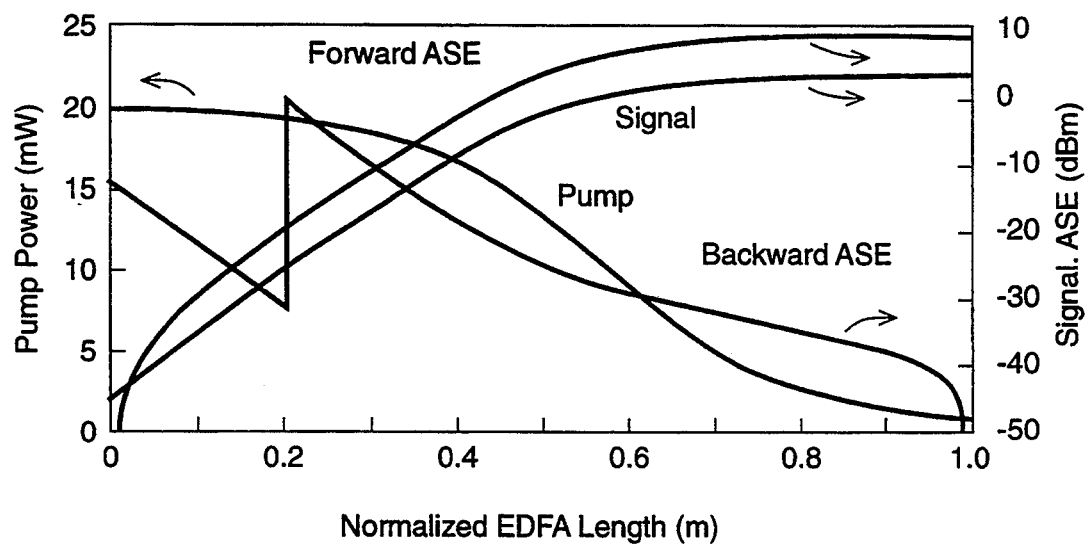

FIGS. 3(a) and (b) show the computed power distribution of the pump, signal, forward and backward ASE along the length of active fibre of the EDFA (normalised to the total active fibre length) without and with the isolator. The curves are for a highly-efficient amplifier design operating in the small-signal regime, and the curves of FIG. 3(a) show the results with an input pump power of 20 mW, an input signal power of −45 dBm, a fiber NA of 0.3 and a dopant/core radius ratio, $R_e$, of 0.7. From FIG. 3(a), it can be seen that in the case without the isolator (i.e. as shown in FIG. 1) the backward ASE grows to a high value (+8 dBm) towards the input end of the amplifier, and therefore, significantly depletes the gain-medium population inversion. In fact, at the input end of the EDFA the pump power is primarily used to amplify the backward-travelling ASE which considerably exceeds the signal. The effect of introducing the isolator (i.e. as shown in FIGS. 2(a) or 2(b)), is shown in FIG. 3(b). The curves of FIG. 3(b) show the results with an input pump power of 20 mW, an input signal power of −45 dBm, a fiber NA of 0.3, an $R_e$ of 0.7 and an isolator extinction ratio (Er) of −30 dB. The backward ASE at the isolator insertion point suffers a reduction equal to the isolator extinction ratio (ER) and must rebuild from a low value. As a result, the backward ASE is significantly reduced at the input end of an amplifier in accordance with FIGS. 2(a) or 2(b) and its effect on the pump depletion much reduced, as evidenced by the fact that the same pump power as in FIG. 3(a) produces a higher signal output power. The pump power retains a high level over a longer EDFA length thus achieving better population inversion over this length. Effectively, a larger proportion of pump photons are transformed into useful signal photons, resulting in higher gain and lower noise figure.

Figure 4A:
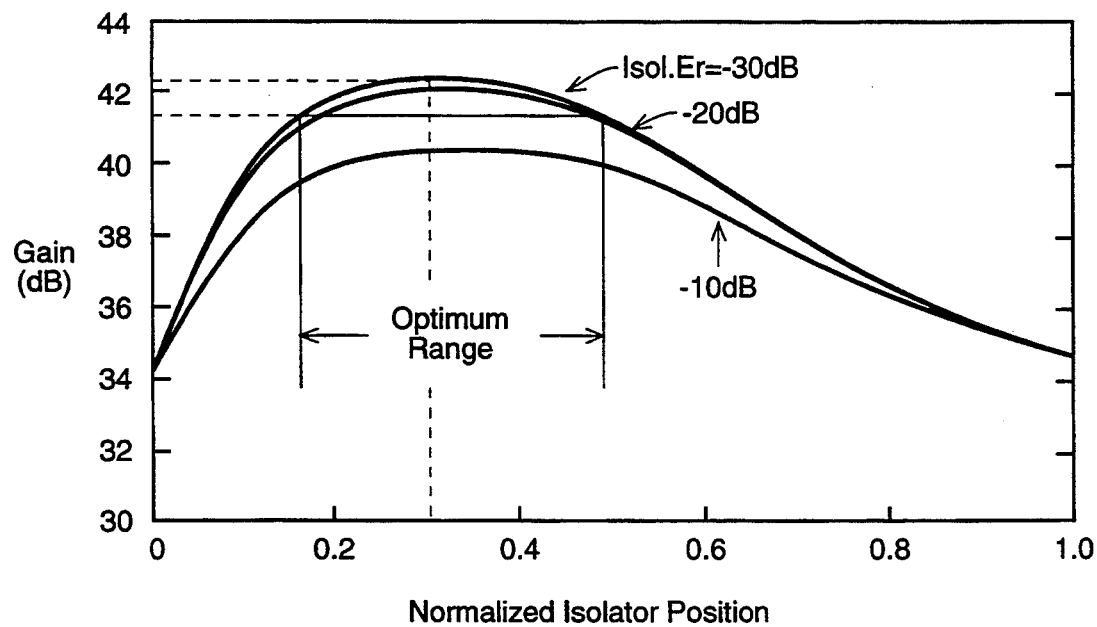
FIG. 4(a) shows gain versus normalised isolator position for an EDFA incorporating an isolator.
Figure 4B:
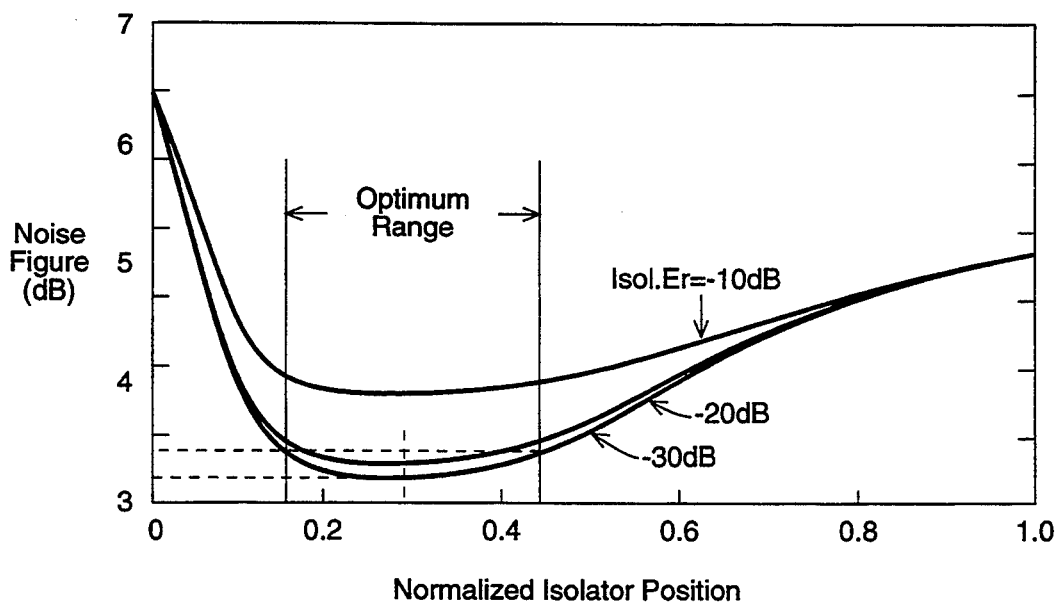
FIG. 4(b) shows noise figure versus normalised isolator position for an EDFA incorporating an isolator.

The relative position of the isolator within the amplifier affects the power distribution of all four interdependent waves (signal, pump, forward and backward ASE) and, therefore, has an impact on the gain and noise figure improvement. In FIGS. 4(a) and (b), typical theoretical predictions of the gain and noise figure are shown, respectively, as a function of the isolator position along the EDF length of the amplifier, (normalised to the optimum total amplifier fibre length and ignoring the length of the tails connecting the isolator to the first and second lengths of EDF), as well as for various isolator extinction ratios. The curves of FIGS. 4(a) and 4(b) show the results with an input pump power of 10 mW, an input signal power of −45 dBm, a fiber NA of 0.3, an Re of 1, an EDFA length of 6.7 m, a pump excess loss ($\alpha_p$ of 0.5 dB and a signal excess loss ($\alpha_s$ of 2 dB. As expected, it is seen that the improvement in gain and noise are insignificant when the isolator is placed towards either end of the EDFA. Away from these extremes, a significant improvement of the composite amplifier performance is predicted. Typical value of the various parameters used in the calculation of the performance characteristics of an EDFA incorporating an isolator as described above are given in the following table.

TABLE

| a) Fibre parameters: | |
|---|---|
| Signal wavelength | 1536 nm |
| Pump wavelength | 980 nm |
| Cut-off wavelength | 870 nm |
| Signal absorption cross-section | $7.9 \times 10^{-25}$ m$^2$ |
| Signal emission cross-section | $6.7 \times 10^{-25}$ m$^2$ |
| Pump absorption cross-section | $2.55 \times 10^{-25}$ m$^2$ |
| Pump emission cross-section | 0 m$^2$ |
| Signal background loss | 0 dB/km |
| Pump background loss | 0 dB/km |
| Fluorescence life-time | 12.1 ms |
| ASE equivalent bandwidth | 4.5 nm |
| Er$^{3+}$ concentration | $10^{25}$ ions/m$^3$ |
| Dopant/core radius ratio ($R_s$) | 1 |
| b) Isolator parameters: | |
| Pump excess loss ($\alpha_p$) | 0.5 dB |
| Signal excess loss ($\alpha_s$) | 2.0 dB |
| c) Input signal power | −45 dBm |

For the parameters shown in the Table, the calculated gain increase is −8 dB and the corresponding noise figure decrease −3.2 dB. The optimum position is determined as the position of the isolator where the noise figure attains its lowest value. The optimum isolator position is at about 0.3 of the total EDFA length from the signal-input end. That is the first length 22 of the EDF has a length which is about 0.3 of the total length of the first and second lengths 22 and 24 of the EDF. However, it is clear that there exist a range of positions (−±0.15 of total EDF length) around the optimum, hereafter called optimum range, where the noise figure deviates slightly (by −0.17 dB) from its optimum (minimum) value. Within the optimum range the gain performance is optimised as well. The gain level varies only by −1 dB. Thus, the isolator can be placed anywhere within the optimum range with only a minor sacrifice of the optimum performance.

Figure 5:
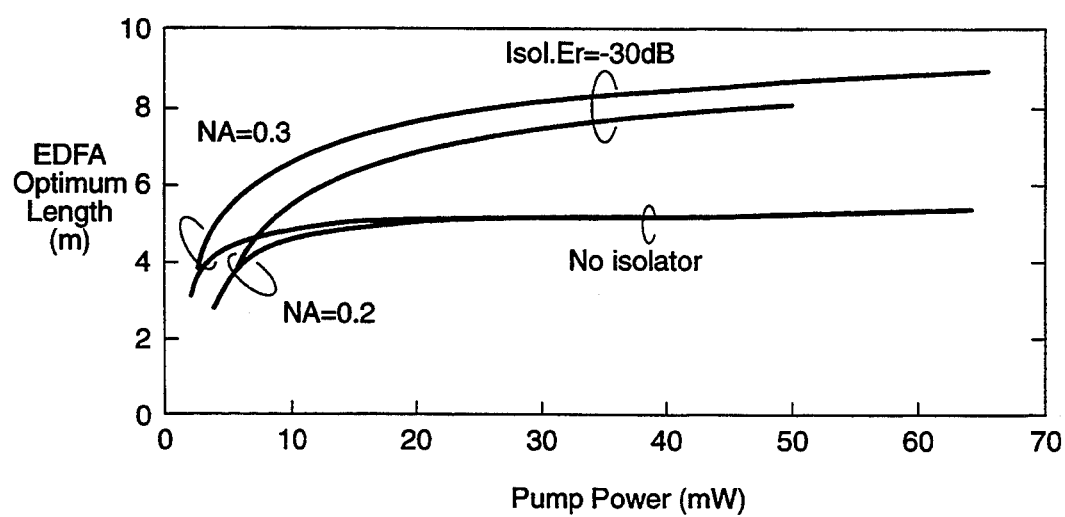
FIG. 5 shows the optimum length of EDFA in amplifiers incorporating an isolator and without an isolator incorporated therein.

Under the same pumping conditions, the optimum length of an EDF of amplifier incorporating an isolator as shown in FIGS. 2(a) or 2(b), i.e. the length that gives the maximum gain for a given pump power, is longer than the length of EDF in the case of an amplifier without isolator, and the amplifier gain and noise performance improves (as will be made clear later). In FIG. 5, the optimum EDF length is plotted against the pump power, for the case with an isolator and without an isolator, for the typical values of the EDF fibre and the isolator, shown in the Table. The curves of FIG. 5 show the results for an input signal power of −45 dBm, Re of 1, an $\alpha_p$ of 0.5 dB and an $\alpha_s$ of 2 dB.

Figure 6:
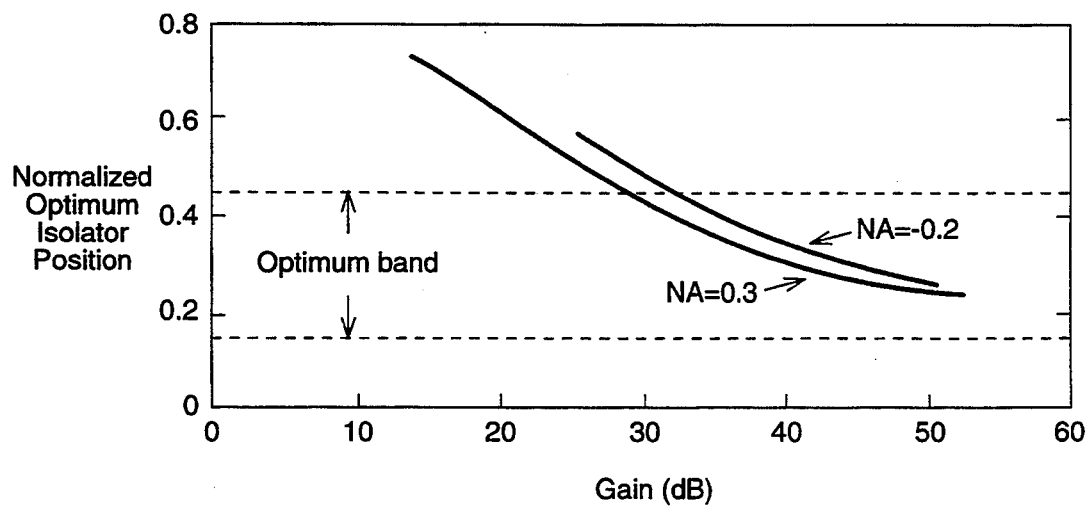
FIG. 6 shows the normalised optimum isolator position versus gain for an EDFA incorporating an isolator.

FIG. 6 shows the optimum isolator positions (normalised to the optimum lengths of FIG. 5) as a function of the calculated amplifier gain level. The curves of FIG. 6 show the results for an input signal power of −45 dBm, an NA of 0.2,0.3, an Re of 1, an isolator extinction ratio (Er) of −30 dB, an $\alpha_p$ of 0.5 dB and an $\alpha_s$ of 2 dB. The optimum range (±0.15), corresponding to the mean normalised optimum position (−0.3), is also shown. It can be seen that the best isolator position remains well within the range 0.30±0.15 of the length for all gains greater than 30 dB. However, for gain levels below 30 dB, the optimum position of the isolator is found to vary significantly both with the fibre parameters and the gain level and the 0.30±0.15 position rule no longer applies. However, as shown later in conjunction with FIGS. 7 and 8, the conditions being the same as the conditions used for the results shown in FIG. 6, there is no significant advantage to incorporating an isolator in the amplifier when the gain requirements are relatively low (below about 30 dB for the particular isolator characteristics used here). This gain limit is determined primarily by the extra pump and signal loss introduced by the isolator and varies with the fibre NA (see FIG. 9). Except for the variation in NA, the results shown in FIG. 9 used the same conditions as the conditions used for the results shown in FIGS. 6–8.

Figure 7:
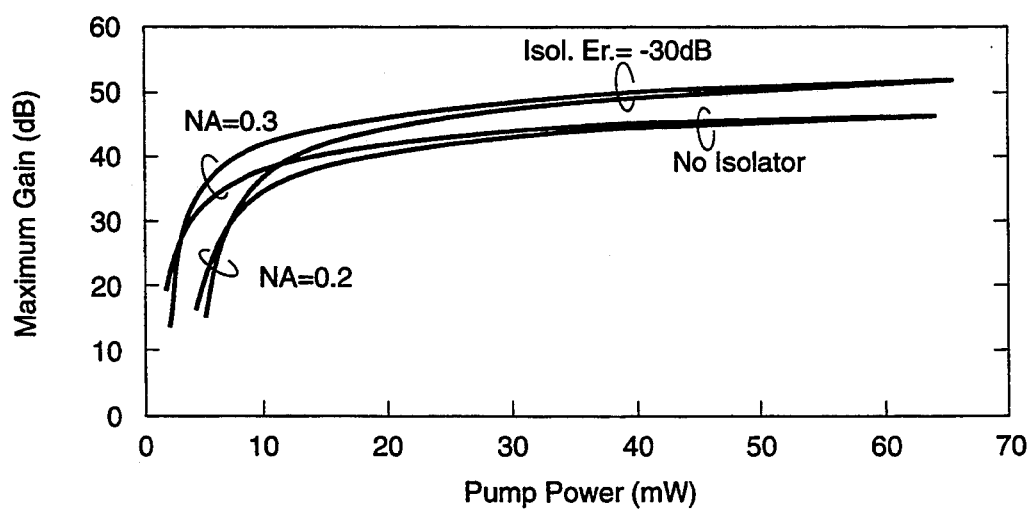
FIG. 7 shows the maximum gain versus pump power when an isolator is incorporated in an EDFA, the length of EDF is optimum and the isolator is placed at the optimum position.
Figure 8:
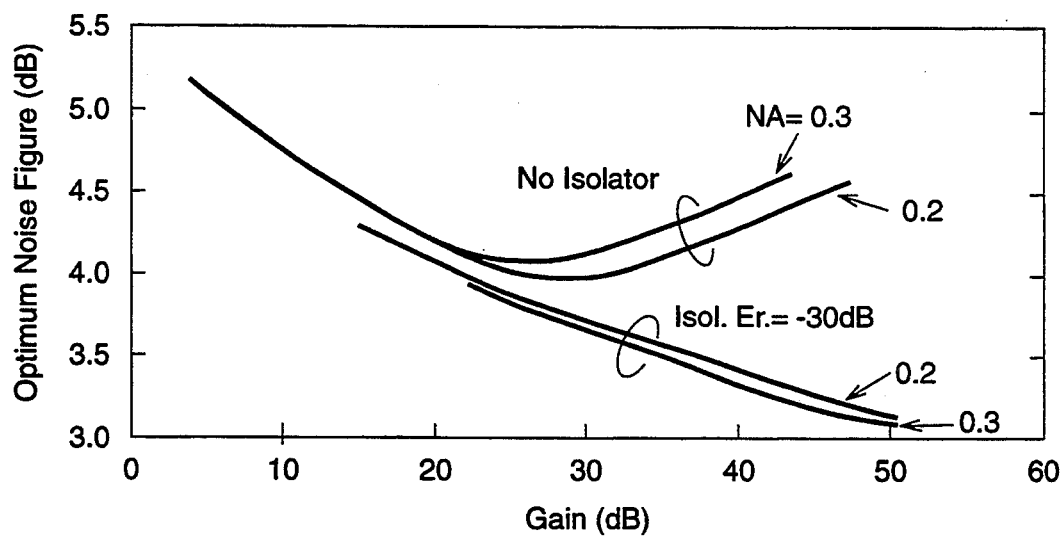
FIG. 8 shows the noise figure versus maximum gain when an isolator is incorporated in an EDFA, the length of EDF is optimum and the isolator is placed at the optimum position.
Figure 9:
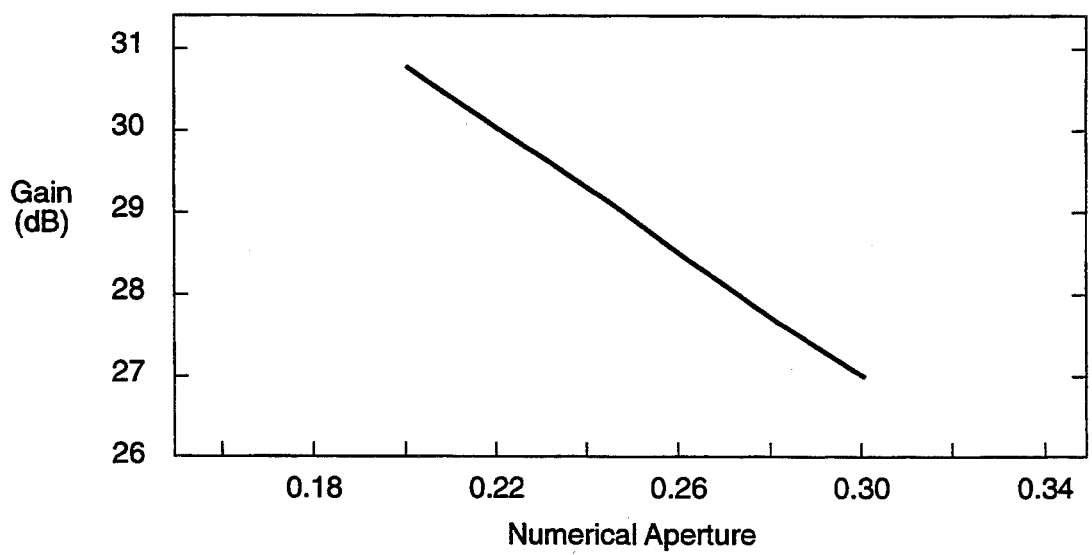
FIG. 9 shows 'cross-over' gain versus numerical aperture.

The advantages of an EDFA amplifier incorporating an isolator over a conventional EDFA are shown schematically in FIGS. 7 and 8 where the maximum attainable gain and the accompanying noise figures have been plotted against the pump power and gain, respectively. The two regimes of operation can now be clearly identified. In the low-pump, low-gain regime the maximum gain improvement is relatively small and below a certain pump level (in this case corresponding to a gain of ~30 dB) there is a deterioration in the gain of the composite amplifier, i.e. incorporating an isolator produces a detrimental effect because of its insertion loss. Apart from a small improvement in the noise performance (as it has already been mentioned, see FIG. 8), there is no significant advantage in using the configuration shown in FIGS. 2(a) or 2(b) in low-gain applications. The "cross-over" pump power below which no advantage occurs varies with the fibre parameters. In FIG. 9, the gain limit above which the use of the proposed amplifier configuration is advantageous is plotted against the fibre NA. Above this limit, the maximum attainable gain increases considerably (>5 dB) and is accompanied by a dramatic reduction of the noise figure (>1.5 dB) to levels close to the 3-dB quantum limit. It is to be noted that if the isolator has no insertion loss there is never a deleterious effect in incorporating it, although the improvements may be minimal. In order to minimise the insertion loss the isolator is by-passed at the pump wavelength, using WDM couplers, as shown in FIG. 2(b). From FIGS. 7 and 8, it is clear that with the proposed configuration a high gain and quantum-limited noise performance of EDF amplifiers can be simultaneously achieved. Such a combination of properties is impossible with the conventional EDF amplifier.

The above results regarding the performance of an EDFA in accordance with FIGS. 2(a) or 2(b) in comparison with the amplifier shown in FIG. 1, can be interpreted in three ways:

(a) for the same pump power, a higher gain and lower noise figure are achieved;

(b) for the same gain, a lower pump power is required and also results in a lower noise figure. In fact the pump requirements of the composite amplifier can be reduced by a factor of 2 while, at the same time, the noise is reduced to a value close to its quantum limit (see FIGS. 7 and 8);

(c) for the same gain and noise figure, the pump power requirements are substantially reduced. This obviously improves the gain and noise performance of the amplifier while at the same time increases the life time of the pump source.

Another advantage of the EDF amplifier incorporating an isolator as discussed above over a known EDFA in a practical system, is a potential reduction of insertion loss at the amplifier input and thus a further improvement of the noise figure by the same amount. When employing high-gain amplifiers in fibre systems, it is usually necessary to incorporate an isolator at the amplifier input to reduce reflections of the backward ASE and their return into the amplifier. This reflection is primarily due to Rayleigh backscattering of the backward ASE and for fibre links greater than ~100 km can produce an equivalent reflection as large as −0.1%, with associated problems with amplifier oscillation. In known amplifier designs an isolator is, therefore, included at the input of the amplifier to completely suppress the backward ASE and prevent this feedback. However, the transmission loss of the isolator (typically 0.5–1.0 dB) increases the insertion loss of the amplifier and degrades its noise figure by the same amount [$NF_{true}=NF_{amp.}+$Insertion Loss(dB)]. Incorporating the isolator inside the EDFA amplifier removes the input loss inherent in the conventional design and improves the noise figure (see FIG. 10). In the conventional design with the isolator at the front end the backward ASE is completely extinguished whereas in an EDFA comprising two lengths of EDF connected in series via an isolator as discussed above, there is always a small amount of backward ASE produced by the first, or upstream lengths of EDF. However, since the gain of the first length of EDF upstream of the isolator is reduced, the backward ASE is also significantly reduced (c.f. FIGS. 3(a) and (b) and the feedback it produces (Rayleigh backscattering) is no longer significant.

From the foregoing it will be appreciated that EDFAs incorporating an isolator as shown for example in the embodiments illustrated in FIGS. 2(a) and 2(b) will be advantageous when used as pre-amplifiers offering high gain (>30 dB), accompanied by near-quantum-limited figures (<3.5 dB) at low pump power.

We claim:

1. An optical amplifier comprising a predetermined length of optical fiber doped with a fluorescing material, said fiber having an input end and an output end, a source of pumping signal energy at a first wavelength connected to said input end for causing said fluorescing material to be raised to a higher energy level, said pumping signal being of a magnitude sufficient to provide pumping signal energy at said output end of said fiber, said fluorescing material emitting light energy both when it drops to a lower energy level spontaneously and when it is subjected to further signal energy at a second wavelength different from said first wavelength, and unidirectional isolator means connected in series with said fiber intermediate said input end and said output end, said isolator means permitting the passage of said further signal energy in the direction from said input end to said output end but substantially reducing the passage in the direction toward said input end of spontaneously emitted energy produced intermediate said isolator means and said output end and by-pass means interconnecting the portion of said fiber between said isolator means and said output end with the portion of said optical fiber between said isolator means and said input end, said by-pass means selectively permitting said pumping signal to pass from said portion of said fiber between said isolator means and said input end to said portion of said fiber between said isolator means and said output end without permitting said spontaneously emitted energy to pass from said portion of said fiber between said isolator means and said output end to said portion of said fiber between said isolator means and said input end.

2. An optical amplifier as set forth in claim 1 wherein said fluorescing material is erbium.

3. An optical amplifier as set forth in claim 2 wherein said first wavelength is about 980 nm.

4. An optical amplifier as set forth in claim 2 wherein said optical isolator is adapted to transmit wavelengths of about 1550 nm in the direction from the input end to said output end and to reduce the transmission of wavelengths of about 1550 nm in the direction of said output end from said input end.

5. An optical amplifier as set forth in claim 4 wherein said first wavelength is about 980 nm.

6. An optical amplifier as set forth in claim 1 further comprising further said isolator means connected in series with said fiber intermediate the first-mentioned said isolator means and said output end and spaced from the first-mentioned said isolator means.

7. An optical amplifier comprising a predetermined length of optical fiber doped with a fluorescing material, said fiber having an input end and an output end, a source of pumping signal energy at a first wavelength connected to said input end for causing said fluorescing material to be raised to a higher energy level, said pumping signal source providing pumping signal energy to the fiber throughout the length of said fiber, said fluorescing material emitting light energy both when it drops to a lower energy level spontaneously and when it is subjected to further signal energy at a second wavelength different from said first wavelength, and unidirectional isolator means connected in series with said fiber intermediate said input end and said output end, said isolator means permitting the passage of said further signal energy in the direction from said input end to said output end but substantially reducing the passage in the direction toward said input end of spontaneously emitted energy produced intermediate said isolator means and said output end and by-pass means interconnecting the portion of said fiber between said isolator means and said output end with the portion of said optical fiber between said isolator means and said input end, said by-pass means selectively permitting said pumping signal to pass from said portion of said fiber between said isolator means and said input end and said portion of said fiber between said isolator means and said output end without permitting said spontaneously emitted energy to pass from said portion of said fiber between said isolator means and said output end to said portion of said fiber between said isolator means and said input end.

* * * * *

UNITED STATES PATENT AND TRADEMARK OFFICE
CERTIFICATE OF CORRECTION

PATENT NO. : 5,375,010
DATED : December 20, 1994
INVENTOR(S) : Zervas et al.

It is certified that error appears in the above-identified patent and that said Letters Patent is hereby corrected as shown below:

Col. 2, line 9, after "the" (second occurrence) insert --second length at the pump wavelength. In this case the backward-travelling ASE--.

Col. 2, lines 9-11, delete --transmission reducing means at the pump wavelength. In this case the backward-travelling ASE--.

Signed and Sealed this

Twenty-fifth Day of April, 1995

*Attest:*

BRUCE LEHMAN

*Attesting Officer*   Commissioner of Patents and Trademarks

UNITED STATES PATENT AND TRADEMARK OFFICE
CERTIFICATE OF CORRECTION

PATENT NO. : 5,375,010
DATED : December 20, 1994
INVENTOR(S) : Zervas et al

It is certified that error appears in the above-indentified patent and that said Letters Patent is hereby corrected as shown below:

Col. 2, line 9, after "the" (second occurrence) cancel "transmission reducing means" and insert in its place "second length".

This certificate supersedes Certificate of Correction issued April 25, 1995.

Signed and Sealed this

Fifteenth Day of August, 1995

Attest:

BRUCE LEHMAN

*Attesting Officer*   *Commissioner of Patents and Trademarks*